United States Patent Office 2,979,501
Patented Apr. 11, 1961

2,979,501

METHIN DYES CONTAINING PYRROLINE NUCLEI

Douglas James Fry, Bernard Alan Lea, and John David Kendall, all of Ilford, England, assignors to Ilford Limited, Ilford, England, a British company No Drawing. Filed May 18, 1959, Ser. No. 813,665

6 Claims. (Cl. 260—240.4)

This invention relates to new pyrrolenine dyes, to their manufacture and to photographic silver halide emulsions containing said dyes.

Pyrrolenine bases of the general Formula I:

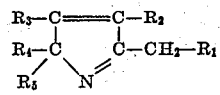

I wherein $R_1$ and $R_2$ are the same or different and are each a hydrogen atom or an alkyl group, $R_3$ is a hydrogen atom or an alkyl or aryl group, and $R_4$ and $R_5$ are separate alkyl groups, may be made by treating a hydroxy pyrroline of the general Formula II:

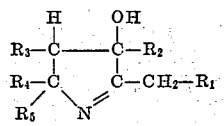

II where the groups $R_1$, $R_2$, $R_3$, $R_4$ and $R_5$ have the meanings assigned to them above, with concentrated sulphuric acid or, where $R_3$ is an aryl group, with a strong aqueous non-oxidising mineral acid such as hydrochloric acid.

Typical compounds of these serise are:

2 : 3 : 5 : 5-tetramethyl-pyrrolenine, B.P. 74° C./8.5 cm. Hg, $n_D$ 1.4550.

2 : 5 : 5-trimethyl-4-phenyl-pyrrolenine, B.P. 110° C./0.1 mm. Hg.

According to the persent invention there is provided a new series of methine dyes which contain a pyrrolenine nucleus of Formula I connected to the remainder of the dye molecule at the methylene group indicated in said formula in the 2-position.

Typical dyes thus provided conform to the following general formulae:

Formula III

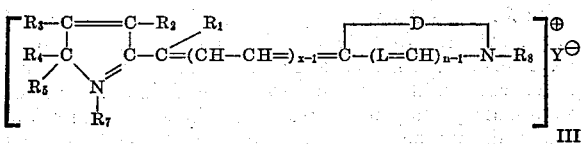

III where $R_1$, $R_2$, $R_3$, $R_4$ and $R_5$ have the meanings given above, $R_7$ is an alkyl or aralkyl group, $R_8$ is an alkyl, aralkyl or aryl group, $x$ is 1, 2, 3 or 4, L is a nitrogen atom or a methin group, and $n$ is 1 or 2, D is the residue of a 5- or 6-membered heterocyclic ring which may be a pyrrolenine ring, and Y is an anion.

Formula IV

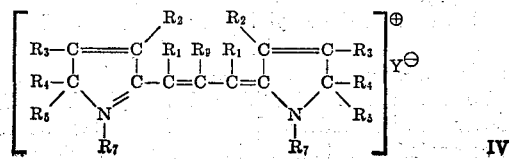

IV where $R_1$, $R_2$, $R_3$, $R_4$, $R_5$, $R_7$ and Y have the meanings given above and $R_9$ is hydrogen or an alkyl group.

Formula V

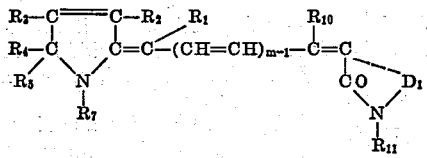

V where $R_1$, $R_2$, $R_3$, $R_4$, $R_5$ and $R_7$ have the meanings given above, $R_{10}$ is a hydrogen atom or an alkyl group, $R_{11}$ is an alkyl, aryl or aralkyl group, a hydroxycarbonylalkyl group or an alkoxycarbonylalkyl group, $D_1$ is the residue of a 5- or 6-membered heterocyclic ring, and $m$ is 1, 2 or 3.

Formula VI

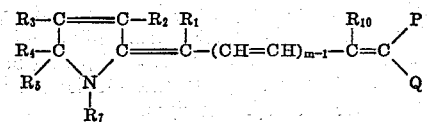

VI where $R_1$, $R_2$, $R_3$, $R_4$, $R_5$, $R_7$, $R_{10}$ and $m$ have the meanings given above, and P and Q are each either an acyl, alkoxycarbonyl or cyano group.

According to a further feature of the present invention, the aforesaid methine dyes are prepared from intermediates of general Formula I by methods known per se (as being in use or as described in the literature) for the conversion of a heterocyclic base containing an extra nuclear reactive methylene group to a methin dye.

More particularly the foregoing and other dyes according to this invention may be produced by condensing an alkyl or aralkyl quaternary salt of a compound of general Formula I with any of the following:

(a) A compound of general Formula VII:

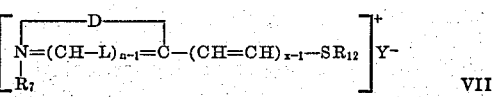

VII where $n$, $x$, $R_7$, Y, L and D have the meanings assigned to them above, and $R_{12}$ is an alkyl, aryl or aralkyl group.

(b) A compound of general Formula VIII:

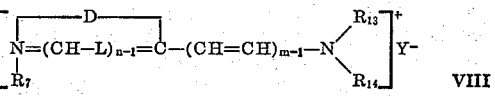

VIII where $R_7$, D, L, $n$ and Y have the meanings assigned to them above, $R_{13}$ is a hydrogen atom or an acyl group, $R_{14}$ is a substituted or unsubstituted phenyl group, and $m$ is 2, 3 or 4.

(c) An ester of an ortho acid or trithio ortho acid such as ethyl orthoformate or ethyl trithio orthoformate.

(d) β-Anilino acrolein anil or glutaconic aldehyde dianil.

(e) A compound of the general Formula IX:

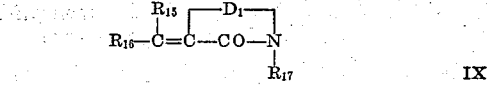

IX where $R_{15}$ is a hydrogen or an alkyl group, $R_{16}$ is an alkoxy, alkylthio, anilino or acetanilido group, $R_{17}$ is an alkyl, aryl or aralkyl group, a hydroxycarbonylalkyl group, or an alkoxycarbonylalkyl group, and $D_1$ is the residue of a five-membered or six-membered heterocyclic nucleus.

(f) A compound of the general Formula X:

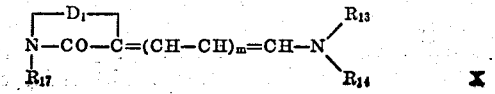

X where $R_{13}$, $R_{14}$, $R_{17}$ and $D_1$ have the meanings assigned to them above, and $m$ is 1 or 2.

(g) A compound of the general Formula XI:

XI where $R_{10}$ has the meaning assigned to it above, $R_{18}$ is an alkoxy, alkylthio, anilino or acetanilido group, and P and Q each represent either an acyl, alkoxy-carbonyl or cyano group.

(h) A compound of the general Formula XII:

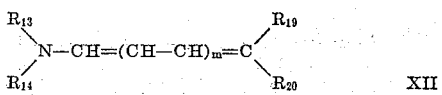

XII where $R_{13}$, $R_{14}$ have the meanings assigned to them above, $R_{19}$ and $R_{20}$ are each an acyl, alkoxycarbonyl or cyano group, and $m$ is 1 or 2.

The dyes obtained by using intermediates (a) and (b) are unsymmetrical mono- or polymethincyanine dyes, using intermediates (c) are symmetrical trimethin cyanine dyes, using intermediates (d) are symmetrical penta- or heptamethincyanine dyes, and using intermediates (e), (f), (g) and (h) are merocyanine dyes.

In preparing the dyes the reactions are preferably effected in a solvent medium and in the presence of a basic condensing agent, e.g. triethylamine.

In a modification of the invention the quaternary salts of the hydroxypyrrolines of general Formula I may be reacted in acetic anhydride with an alkyl ester of trithioformic acid or with diphenylformamidine, β-anilino-acrolein anil or with glutaconic aldehyde dianil to give intermediates of Formula XIII:

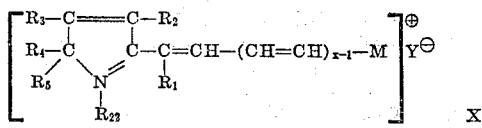

XIII where Y is an acid radicle, M is an alkylthio or acetanilido group, $x$ is 1, 2 or 3 (except that when M is alkylthio $x$ is 1), $R_{22}$ is an alkyl or aralkyl group, and the other symbols have the meanings assigned to them above.

These intermediates may be reacted with the quaternary salts of heterocyclic compounds having an active methyl or methylene group to form cyanine dyes or with a compound having an open-chain or cyclic reactive methylene group to form merocyanine dyes.

The dyes are valuable sensitisers for photographic silver halide emulsions, particularly gelatino silver chlorobromide emulsions, and may be used in the manner known per se for methin dyes used as optical sensitisers for photographic emulsions. This invention includes photographic silver halide emulsions containing the said dyes in sensitising amount.

The following examples will serve to illustrate the invention:

EXAMPLE 1

*3-ethyl-5[(1:3:5:5-tetramethyl-2-pyrrolinylidene) ethylidene]2-thiothiazolid-4-one*

(a) 2 : 3 : 5 : 5-tetramethyl pyrrolenine methiodide: 2 : 3 : 5 : 5-tetramethyl-pyrrolenine (1.23 g.) was warmed under reflux and methyl iodide added dropwise—a strongly exothermic reaction occurring. After warming for a few minutes to complete the reaction, excess methyl iodide was evaporated off under reduced pressure.

(b) 5 - ethoxymethylene-3-ethyl-2-thio-thiazolid-4-one (1.6 g.), ethanol (10 ml.) and triethylamine (1.4 ml.) were then added to the quaternary salt and the whole heated under reflux for 10 minutes, cooled thoroughly and filtered. The crude product (1.5 g.) was crystallised from a mixture of benzene (30 ml.) and cyclohexane (50 ml.) to give crimson rods (0.9 g.) with M.P. 139–141° C.

When incorporated in a silver chlorobromide emulsion the sensitivity was extended to 5850 A. with a maximum at 5500 A.

EXAMPLE 2

*3-phenyl-5[(1:3:5:5-tetramethyl-2-pyrrolinylidene) ethylidene]-2-thiothiazolid-4-one*

The dye was prepared as in Example 1 but using 5-ethoxymethylene-3-phenyl-2-thio-thiazolid-4-one (2.4 g.) in place of the corresponding 3-ethyl compound. The crude product (1 g.) was twice crystallised from ethanol to give purple plates (0.45 g.) with M.P. 223–225° C.

When incorporated in a silver chlorobromide emulsion the sensitivity was extended to 5850 A. with a maximum at 5500 A.

EXAMPLE 3

*2(3-methylbenzthiazole)-2(1:3:5:5-tetramethyl-pyrrolenine) monomethincyanine iodide*

2 : 3 : 5 : 5-tetramethyl-pyrrolenine methiodide (1.75 g.), methylthiobenzthiazole metho-toluene-p-sulphonate (3.7 g.), ethanol (8 mls.) and triethylamine (1.4 ml.) were mixed, heated under reflux for 5–10 minutes, cooled and poured into dry ether. The precipitated oil crystallised when stirred with a small volume of ethanol and after recrystallising from ethanol the dye formed small yellow crystals with M.P. 304–307° C. (d).

When incorporated in a silver chlorobromide emulsion the sensitivity was extended to 4700 A. with a maximum at 4500 A.

EXAMPLE 4

*1:3-dimethyl-5[(1:3:5:5-tetramethyl-pyrrolinylidene) ethylidene]-2-thiohydantoin*

2 : 3 : 5 : 5-tetramethyl-pyrrolenine methiodide (1.3 g.), diphenyl formamidine (1.1 g.) and acetic anhydride (10 ml.) were mixed, heated under reflux for 15 minutes, cooled and poured into dry ether to precipitate a gum which was dissolved in ethanol (10 ml.). To this solution was added 1 : 3-dimethyl-2-thiohydantoin (0.72 g.) and triethylamine (0.7 ml.), followed by heating under reflux for 10 minutes. The crude product crystallised on cooling the reaction mixture in ice to give 0.76 g. dye with M.P. 210–218° C. After crystallisation from benzene the product was obtained as minute red crystals (0.4 g.) with M.P. 218–222° C.

When incorporated in a silver chlorobromide emulsion the sensitivity was extended to 5650 A. with a maximum at 5300 A.

EXAMPLE 5

*Bis-2(1:3:5:5-tetramethyl-pyrrolenine) trimethincyanine iodide*

2 : 3 : 5 : 5-tetramethyl-pyrrolenine methiodide (2.65 g.), ethyl orthoformate (3 ml.) and pyridine (10 ml.) were mixed and heated gently under reflux for ½ hour. After cooling the solution was poured into 25 ml. of saturated aqueous sodium iodide solution. After filtration the crude product (0.47 g.) had M.P. 212–222° C. and was crystallised from ethanol (10 ml.) to give purple crystals (0.15 g.) with M.P. 217–220° C.

EXAMPLE 6

*3-ethyl-5[(1:5:5-trimethyl-4-phenyl-2-pyrrolinylidene) ethylidene]-2-thio-thiazolid-4-one*

2 : 5 : 5-trimethyl-4-phenyl-pyrrolenine (2 g.) and methyl iodide (4 ml.) were mixed, warmed for 2 minutes and then excess methyl iodide evaporated off under reduced pressure. To the residual quaternary salt was added 5 - ethoxymethylene-3-ethyl-2-thio-thiazolid-4-one (2.0 g.), ethanol (10 ml.) and triethylamine (1.2 ml.). After heating under reflux for 5 minutes the solution was cooled and diluted with water to precipitate an oil which hardened when stirred with petroleum ether (B.P. 40–60° C.). Prolonged standing with methanol (50 ml.) promoted crystallisation to give 0.91 g. of dye with M.P. 171–174° C. After recrystallisation from a mixture of cyclohexane (50 ml.) and benzene (25 ml.) the product formed microscopic prisms (0.58 g.) with M.P. 188–190° C.

When incorporated in a silver chlorobromide emulsion the sensitivity was extended to 5850 A. with a maximum at 5500 A.

EXAMPLE 7

*2(3:3-dicyanoallylidene)-1:3:5:5-tetramethyl-pyrroline*

2 : 3 : 5 : 5-tetramethyl-pyrrolenine methiodide (2.65 g.), diphenyl formamidine (2.2 g.) and acetic anhydride (10 ml.) were mixed and heated under reflux for 15 minutes, cooled and poured into dry ether to precipitate a gum which was dissolved in ethanol (10 ml.). To this solution was added malondinitrile (0.5 g.) and triethylamine (1.4 ml.), the whole then being heated under reflux for 10 minutes, cooled well and filtered. The residue of crude product (0.5 g. M.P. 225–228° C.) was crystallised from ethanol (100 ml.) to give the dye as small yellow needles (0.42 g.) with M.P. 225–227° C.

EXAMPLE 8

*2(5:5-dicyano-penta-2:4-dienylidene)-1:3:5:5-tetramethyl-pyrroline*

Malondinitrile (0.66 g.), β-anilino acrolein anil (2.24 g), methanol (10 ml.) and triethylamine (1.4 ml.) were mixed, heated under reflux for 15 minutes and then solvent evaporated off under reduced pressure. The residue was next boiled under reflux for 15 minutes with acetic anhydride (10 ml.) and the excess then distilled off from the steam bath under reduced pressure. 2 : 3 : 5 : 5-tetramethylpyrrolenine methiodide (1.23 g.), ethanol (10 ml.) and triethylamine (1.4 ml.) were added, the whole heated under reflux for 10 minutes, cooled in ice and filtered. The crude product (0.67 g. M.P. 228–230° C.) was crystallised from ethanol (20 ml.) to give the dye as minute dark red crystals (0.33 g.) with M.P. 245–248° C.

When incorporated in a silver chlorobromide emulsion the sensitivity was extended to 5500 A. with a maximum at 5350 A.

EXAMPLE 9

*2(3:3-dicyanoallylidene)-4-phenyl-1:5:5-trimethyl-pyrroline*

4-phenyl-2 : 5 : 5-trimethyl-pyrrolenine (1.4 g.) was mixed with methyl iodide (3.4 ml.) and heated under reflux for 10 minutes. After evaporation of excess methyl iodide under reduced pressure, diphenyl formamidine (1.9 g.) and acetic anhydride (8 ml.) were added and the whole heated under reflux for 20 minutes. The cooled solution was poured into dry ether to precipitate a gum which was dissolved in ethanol (10 ml.). To this solution was added malondinitrile (0.35 g.) and triethylamine (1.05 ml.) and the mixture heated under reflux for 10 minutes. After cooling the product (0.28 g.) M.P. 224–234° C. was filtered off and crystallised from ethanol (50 ml.) to give pale orange needles (0.16 g.) with M.P. 238–240° C.

EXAMPLE 10

*1:3-diethyl-5[(1:3:5:5-tetramethyl-2-pyrrolinylidene) ethylidene]-2-thiobarbituric acid*

2 : 3 : 5 : 5-tetramethyl-pyrrolenine methiodide (2.65 g.), diphenyl formamidine (2.2 g.) and acetic anhydride (10 ml.) were mixed and heated under reflux for 15 minutes, cooled and poured into dry ether to precipitate a gum which was dissolved in ethanol (10 ml.). To this solution was added 1 : 3-diethyl-2-thiobarbituric acid (1.5 g.) and triethylamine (1.4 ml.), the whole then being heated under reflux for 10 minutes, cooled in ice and filtered. The crude dye (1.3 g. M.P. 254–256° C.) was crystallised from ethanol (105 ml.) to give the product as microscopic orange needles (1.1 g.) with M.P. 258° C.

When incorporated in a silver chlorobromide emulsion the sensitivity was extended to 5150 A. with a maximum at 4800 A.

EXAMPLE 11

*3[(1:3:5:5-tetramethyl-2-pyrrolinylidene) ethylidene] acetylacetone*

2 : 3 : 5 : 5-tetramethyl-pyrrolenine methiodide (2.65 g.), 3-ethoxymethylene acetylacetone (2 g.), ethanol (10 ml.) and triethylamine (1.4 ml.) were mixed and heated under reflux for 10 minutes. After cooling the reaction mixture was diluted with water (100 ml.) and a crystalline solid slowly separated. After filtration and washing with acetone, the product (0.66 g. M.P. 124–126° C.) was purified by dissolving in a hot mixture of ethanol (2.5 ml.) and ethyl acetate (2.5 ml.) followed by dilution with light petroleum (40 ml. B.P. 40–60° C.). The product separated as fine orange coloured needles (0.34 g.) with M.P. 135–136° C.

When incorporated in a silver chlorobromide emulsion the sensitivity was extended to 4800 A.

EXAMPLE 12

*4(1-methyl-quinazoline)-2(1:3:5:5-tetramethyl-pyrrolenine) monomethincyanine iodide*

2 : 3 : 5 : 5-tetramethyl pyrrolenine methiodide (1.3 g.), 4-methylthio-quinazoline methiodide, ethanol (10 ml.) and triethylamine (0.8 ml.) were mixed, heated under reflux for 10 minutes, cooled and poured into cold water (50 ml.). The dye was twice extracted with chloroform (40 ml. portions) and the extract evaporated to leave an oil which crystallised when stirred with a mixture of methanol and ethylacetate. The crude product (0.4 g. M.P. 202–204° C.) was filtered off and recrystallised from ethanol (6 ml.) to give orange crystals (0.18 g.) with M.P. 203° C.

When incorporated in a silver chlorobromide emulsion the sensitivity was extended to 4650 A. with a maximum at 4500 A.

EXAMPLE 13

*2(3-methylbenzthiazole)-2(1:3:5:5-tetramethyl-pyrrolenine) trimethincyanine iodide*

2 : 3 : 5 : 5-tetramethyl-pyrrolenine methiodide (2.65 g.), diphenyl formamidine (2.2 g.) and acetic anhydride (10 ml.) were mixed and heated under reflux for 15 minutes, cooled and poured into dry ether to precipitate a gum which was dissolved in ethanol (10 ml.). To this solution was added 2 : 3-dimethyl-benzthiazolium toluene-p-sulphonate (3.4 g.) and triethylamine (1.4 ml.), the whole then being heated under reflux for 10 minutes, cooled and filtered. After washing with acetone and ethyl acetate, the crude product (0.75 g. M.P. 208–210° C.) was crystallised from ethanol (100 ml.) to give the dye as reddish purple crystals (0.44 g.) with M.P. 220° C.

When incorporated in a silver iodobromide emulsion the sensitivity was extended to 5750 A. with a maximum at 5400 A.

EXAMPLE 14

*3-ethyl-2-thio-5[(1-ethyl-3:5:5-trimethyl-2-pyrrolinylidene) ethylidene] thiazolid-4-one*

2 : 3 : 5 : 5-tetramethyl-pyrrolenine (1.23 g.) and ethyl iodide (2 ml.) were mixed, heated under reflux for 5 minutes and excess ethyl iodide evaporated off under reduced pressure. To this was added 5-ethoxymethylene-3-ethyl-2-thiothiazolid-4-one (2.17 g.), ethanol (10 ml.) and triethylamine (1.4 ml.) and the solution heated under reflux for 10 minutes, cooled and diluted with water to precipitate an oil. The oil partly crystallised on standing and was purified by filtration followed by solution of the residue in benzene. Cyclohexane added to this solution caused the dye to separate as red coloured crystals with M.P. 140° C.

When incorporated in a silver chlorobromide emulsion the sensitivity was extended to 5950 A. with a maximum at 5500 A.

EXAMPLE 15

*3-ethyl-2-thio-5[(1-benzyl-3:5:5-trimethyl-2-pyrrolinylidene)ethylidene] thiazolid-4-one*

2 : 3 : 5 : -tetramethyl-pyrrolenine (1.23 g.) and benzyl bromide (2 ml.) were mixed and heated on a steam bath for 5 minutes. The quaternary salt formed was washed with dry ether by decantation. To this was added 5-ethoxymethylene-3-ethyl-2-thio-thiazolid-4-one (2.17 g.), ethanol (10 ml.) and triethylamine (1.4 ml.) and the solution heated under reflux for 10 minutes, cooled and diluted with water to precipitate an oil which slowly crystallised when stirred with acetone. The dye was purified as in Example 14 to give dark red crystals with M.P. 186° C.

EXAMPLE 16

*1-phenyl-3-methyl-4-[(1:3:5:5-tetramethyl-2-pyrrolinylidene)ethylidene]-pyrazol-5-one*

2 : 3 : 5 : 5-tetramethyl-pyrrolenine methiodide (2.6 g.), diphenyl formamidine (2.2 g.) and acetic anhydride (10 ml.) were mixed and heated under reflux for 20 minutes, cooled and poured into dry ether to precipitate a gum which was dissolved in ethanol (10 ml.). To this solution was added 1-phenyl-3-methyl-pyrazol-5-one (1.4 g.) and triethylamine (1.4 ml.) followed by heating under reflux for 10 minutes. After cooling, the solution was diluted with water to precipitate an oil which partly crystallised. This paste was filtered, and washing with a small volume of cyclohexane left 0.3 g. of crude product with M.P. 155° C. Crystallisation from cyclohexane (120 ml.) gave the dye as orange crystals (0.15 g.) with M.P 156° C.

EXAMPLE 17

*3-carboxymethyl-2-thio-5[(1:3:5:5-tetramethyl-2-pyrrolinylidene)ethylidene] thiazolid-4-one*

2 : 3 : 5 : 5-tetramethyl-pyrrolenine methiodide (2.6 g.), diphenyl formamidine (2.2 g.) and acetic anhydride (10 ml.) were mixed and heated under reflux for 20 minutes, cooled and poured into dry ether to precipitate a gum which was dissolved in ethanol (10 ml.). To this solution was added 3-carboxymethyl-2-thiothiazolid-4-one (1.9 g.) and triethylamine (2.8 ml.) followed by heating under reflux for 10 minutes. After cooling the solution was poured into an ice-cold solution of concentrated hydrochloric acid (1.2 ml.) in water (100 ml.). The product separated as an oil which solidified on standing to give 1.9 g. of dye with M.P. 136–139° C.

What we claim is:
1. A dyestuff of the formula:

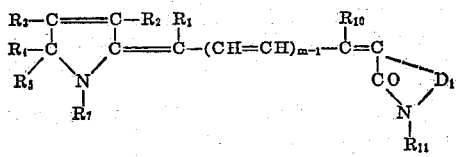

wherein $R_1$, $R_2$, $R_{10}$ are each selected from the class consisting of hydrogen and lower alkyl groups, $R_3$ is selected from the class consisting of hydrogen, lower alkyl and phenyl groups, $R_4$, $R_5$ are each lower alkyl groups, $R_7$ is selected from the class consisting of lower alkyl and benzyl groups, $R_{11}$ is selected from the class consisting of lower alkyl, phenyl, benzyl, hydroxy carbonyl lower alkyl and lower alkoxy carbonyl lower alkyl groups, $m$ is an integer selected from the group consisting of 1, 2 and 3, and $D_1$ represents the non-metallic atoms necessary to complete a heterocyclic nucleus selected from the group consisting of a thia-thiazolidone nucleus, a barbituric acid nucleus, a hydantoin nucleus and a pyrazole-5-one nucleus.

2. 3-ethyl-5[(1 : 3 : 5 : 5-tetramethyl - 2 - pyrrolinylidene)ethylidene]-2-thiothiazolid-4-one.

3. 3-phenyl-5[(1 : 3 : 5 : 5-tetramethyl - 2 - pyrrolinylidene)ethylidene]-2-thiothiazolid-4-one.

4. 1 : 3-dimethyl - 5[(1 : 3 : 5 : 5 - tetramethyl - pyrrolinylidene) ethylene]-2-thiohydantoin.

5. 1 : 3-diethyl-5[(1 : 3 : 5 : 5-tetramethyl - 2 - pyrrolinylidene) ethylidene]-2-thiobarbituric acid.

6. 1-phenyl-3-methyl-4[(1 : 3 : 5 : 5-tetramethyl - 2 - pyrrolinylidene) ethylidene]-pyrazol-5-one.

References Cited in the file of this patent
UNITED STATES PATENTS

| | | |
|---|---|---|
| 2,298,731 | Brooker et al. | Oct. 13, 1940 |
| 2,409,612 | Brooker et al. | Aug. 15, 1941 |
| 2,739,147 | Keyes | Mar. 20, 1956 |
| 2,739,148 | Reed | Mar. 20, 1956 |

FOREIGN PATENTS

| | | |
|---|---|---|
| 524,483 | Belgium | Dec. 15, 1953 |
| 516,228 | Italy | Feb. 19, 1955 |

OTHER REFERENCES

Chemical Abstracts, vol. 8, pp. 1763 to 1764 (1914), Abstract of Plancher et al., Atti accad. Lincei, vol. 22, pages 703–7.

Brooker et al.: Journal of the Am. Chem. Soc., vol. 67, pages 1869–1879 (1945) (particularly note pp. 1869–1871).

Venkataraman: Synthetic Dyes, vol. II, pages 1143 to 1185, Academic Press Inc., 1952.

Strell et al.: Chemische Berichte, vol. 87, pp. 1025 to 1032 (1954).